G. WESTINGHOUSE, Jr.
Fluid-Ejector.

No. 160,803. Patented March 16, 1875.

Witnesses: Chas. G. Page, C. L. Parker.

Inventor: George Westinghouse Jr. by George H. Christy his atty.

UNITED STATES PATENT OFFICE.

GEORGE WESTINGHOUSE, JR., OF PITTSBURG, PENNSYLVANIA.

IMPROVEMENT IN FLUID-EJECTORS.

Specification forming part of Letters Patent No. 160,803, dated March 16, 1875; application filed December 24, 1874.

*To all whom it may concern:*

Be it known that I, GEORGE WESTINGHOUSE, Jr., of Pittsburg, county of Allegheny, State of Pennsylvania, have invented or discovered a new and useful Improvement in Fluid-Ejectors; and I do hereby declare the following to be a full, clear, concise, and exact description thereof, reference being had to the accompanying drawing making a part of this specification, in which—like letters indicating like parts—

Figure 1:
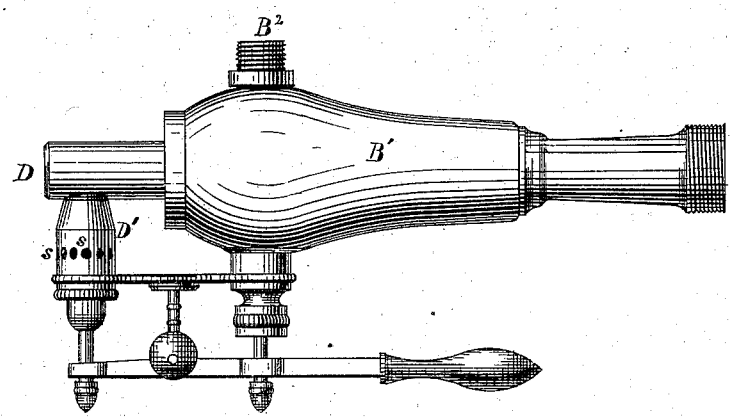
Figure 2:
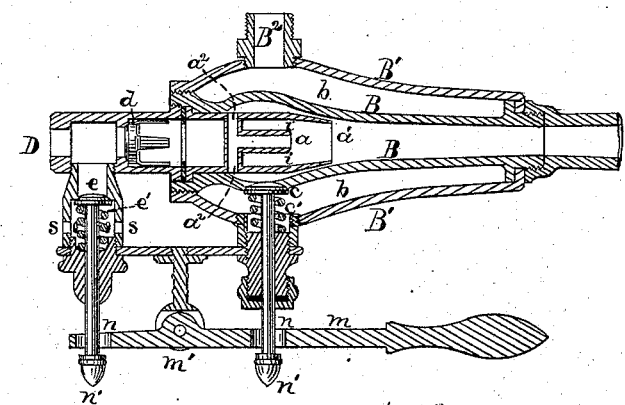

Figure 1 represents my improvement in side elevation, and Fig. 2 in longitudinal vertical section.

This invention relates to certain improvements in fluid-ejectors, which I design for use especially in the operation of vacuum-brakes on railway-trains, though also capable of use for moving fluids generally by exhaustion, either with or without the transmission of power thereby; and it consists in the combination of two jets in a common head, one of which shall act centrally on the outgoing column of fluid, and the other annularly on the outside of such column, such jets being arranged to act successively and in different planes on the outgoing column of air. It further consists in the combinations of elements hereinafter set forth and claimed.

The ejector-head B is surrounded by an outer casing, $B^1$, in such manner as to form between the two a steam-chamber, $b$, which, being kept full of steam, constitutes a steam-jacket. Inside the head B are the ejector-nozzles $a\ a^1$, so arranged as to give both a central and an annular jet. Connection is made at D with the brake-pipe and cylinders, or other source or supply of fluid to be exhausted. In the barrel or line of communication of the pipe D is a check-valve, $d$, of any suitable construction, such that it will readily open to an outgoing force, but close to prevent a back or reverse flow. A pipe, $B^2$, leads from the steam-generator, so as to keep the chamber $b$ supplied with steam; and by a valve, $c$, steam is admitted therefrom at the pleasure of the operator to the space inside the head. A portion of it escapes with great force at the annular passage between the nozzle $a^1$ and the head B, so as to produce and act on the outside of the outgoing column of air or other fluid, which is thereby caused to flow through and along the pipe D, and out by the annular chamber or passage $i$ between the nozzles $a\ a^1$; and another portion passes, by one or more holes, $a^2$, into, and escapes with force at, the central nozzle $a$, so as to act on the outgoing column of fluid in or near the axial line thereof, and thus co-operate with the annular jet in securing such outflow.

It will be observed that the jets $a\ a^1$ are arranged with the discharge-openings not in the same plane, but one somewhat in advance of the other, so that the force of the escaping steam shall act at successive points or in different planes on the outgoing column of air, and thereby one jet shall assist the other.

The ports $a^2$ are made in a cross-bar, or in one or more arms of a spider-frame arranged in the line of communication from the pipe D; but openings are left around or through such bar or frame sufficient for the outflow of the fluid from the pipe D without material obstruction, and such line of outflow thence passes along between the nozzles. The valve $c$ is held to its seat, if so desired, by a spring, $c'$.

To adapt this ejector for use with vacuum-brake mechanism or other similar uses, in which it is necessary to readmit air into the pipes and cylinders, or other source from which it has been exhausted, I arrange a valve, $e$, in a communicating box or case, $D'$, so that, on the valve $e$ being raised from its seat, external air may readily pass in from suitable apertures $s$ above the valve, and so restore atmospheric pressure. The valve is held down, if so desired, by a spring, $e'$.

As an advantageous means of operating the valves $c$ and $e$, I extend the stems of each through a slot, $n$, in a common lever, $m$, which is pivoted between such stems, as at $m'$. A button, $n'$, on the outer end of each stem, the bearing-surface of which is broader than the slot, affords a means of raising the valves; but these connections are such, as shown in the drawing, that both valves will be seated when the lever is free, and such that either valve can be opened by an appropriate movement of the lever without opening the other one, and also such that both valves can be opened by the same lever.

Preferably, the lever is made with a slight play on the valve-stems, so that, even though the valve seats or faces wear away somewhat, they may still operate as described.

For the slots $n$ and knobs $n'$ other like suitable connection may be employed, having a function and operation substantially the same.

The ejector described is arranged in any desired position with reference to the work to be done, though, for convenience in getting rid of the water of condensation, the nozzles may advantageously discharge downward.

The same devices may be used as an injector when desired, and also for many purposes may be operated by fluid pressure other than steam.

What I claim as my invention, and desire to secure by Letters Patent, is—

1. In an ejector device, the combination of a central jet-nozzle, an annular jet-nozzle, and an intermediate annular exhausting-chamber, such jet-nozzles being arranged with their discharge-openings one somewhat in advance of the other, whereby the force of the escaping steam shall act at successive points or in different planes on the outgoing column of fluid, substantially as set forth.

2. The valves $c\ e$, seated by spring-pressure and opened by opposite movements of a common lever, in combination with an ejector-nozzle and check-valve, substantially as set forth.

In testimony whereof I have hereunto set my hand.

GEORGE WESTINGHOUSE, JR.

Witnesses:
   JAMES M. CHRISTY,
   GEORGE H. CHRISTY.